US012469502B2

(12) United States Patent
Pihlajakuja et al.

(10) Patent No.: US 12,469,502 B2
(45) Date of Patent: Nov. 11, 2025

(54) SPATIAL AUDIO PARAMETER ENCODING AND ASSOCIATED DECODING

(71) Applicant: NOKIA TECHNOLOGIES OY, Espoo (FI)

(72) Inventors: Tapani Pihlajakuja, Kellokoski (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 208 days.

(21) Appl. No.: 18/245,789

(22) PCT Filed: Aug. 25, 2021

(86) PCT No.: PCT/FI2021/050572
§ 371 (c)(1),
(2) Date: Mar. 17, 2023

(87) PCT Pub. No.: WO2022/058646
PCT Pub. Date: Mar. 24, 2022

(65) Prior Publication Data

US 2024/0029745 A1 Jan. 25, 2024

(30) Foreign Application Priority Data

Sep. 18, 2020 (GB) ...................................... 2014771

(51) Int. Cl.
*G10L 19/008* (2013.01)
*G10L 19/025* (2013.01)
*G10L 19/032* (2013.01)

(52) U.S. Cl.
CPC .......... *G10L 19/008* (2013.01); *G10L 19/025* (2013.01); *G10L 19/032* (2013.01)

(58) Field of Classification Search
None
See application file for complete search history.

(56) References Cited

U.S. PATENT DOCUMENTS 6,510,407 B1 * 1/2003 Wang ...................... G10L 19/18 704/E19.041
10,873,814 B2 12/2020 Vilkamo et al.
(Continued)

FOREIGN PATENT DOCUMENTS

CN 106023999 A 10/2016
CN 107077858 A 8/2017
(Continued)

OTHER PUBLICATIONS

First Examination Report for Indian Application No. 202317025476 dated Dec. 23, 2024, 8 pages.
(Continued)

*Primary Examiner* — Shaun Roberts
(74) *Attorney, Agent, or Firm* — ALSTON & BIRD LLP

(57) ABSTRACT

An apparatus comprising means configured to: obtain at least one audio signal; obtain, for the at least one audio signal, spatial audio signal parameter values, the spatial audio signal parameters values distributed within a time-frequency domain (106); determine a merge metric to control a merging of the spatial audio signal parameter values over the time-frequency domain (201); and merge (203), based on the merge metric (202), the spatial audio signal parameter values to a smaller number of spatial audio signal parameter values overtime and/or frequency within the time-frequency domain.

9 Claims, 9 Drawing Sheets

(56) References Cited

U.S. PATENT DOCUMENTS

| | | | | |
|---|---|---|---|---|
| 2005/0281412 | A1 | 12/2005 | Hillman et al. | |
| 2010/0063806 | A1* | 3/2010 | Gao | G10L 19/22 704/E21.001 |
| 2011/0054648 | A1* | 3/2011 | Maxwell | G10L 25/48 700/94 |
| 2013/0022206 | A1* | 1/2013 | Thiergart | G10L 19/0204 381/17 |
| 2014/0039890 | A1* | 2/2014 | Mundt | G10L 19/167 704/236 |
| 2015/0332679 | A1* | 11/2015 | Kruger | G10L 19/008 |
| 2015/0332680 | A1* | 11/2015 | Crockett | G10L 19/20 381/23 |
| 2019/0132674 | A1 | 5/2019 | Vilkamo | |
| 2020/0265851 | A1* | 8/2020 | Fuchs | G10L 19/032 |
| 2020/0314580 | A1* | 10/2020 | Norvell | H04S 7/303 |
| 2021/0295855 | A1 | 9/2021 | Vasilache et al. | |
| 2021/0319799 | A1 | 10/2021 | Pihlajakuja et al. | |
| 2021/0407525 | A1 | 12/2021 | Vasilache et al. | |
| 2022/0189494 | A1 | 6/2022 | Laitinen et al. | |
| 2023/0402046 | A1 | 12/2023 | Disch et al. | |
| 2024/0422494 | A1 | 12/2024 | Laitinen et al. | |

FOREIGN PATENT DOCUMENTS

| | | | |
|---|---|---|---|
| CN | 111316354 | A | 6/2020 |
| EP | 2375410 | A1 | 10/2011 |
| EP | 2717261 | A1 | 4/2014 |
| GB | 2576769 | A | 3/2020 |
| GB | 2577698 | A | 4/2020 |
| GB | 2582749 | A | 10/2020 |
| GB | 2590650 | | 7/2021 |
| GB | 2590651 | | 7/2021 |
| GB | 2595871 | A | 12/2021 |
| WO | WO 2016/133785 | A1 | 8/2016 |
| WO | WO 2019/086757 | A1 | 5/2019 |
| WO | WO 2019/229299 | A1 | 12/2019 |
| WO | WO 2019/234290 | A1 | 12/2019 |
| WO | WO 2020/043935 | A1 | 3/2020 |
| WO | WO 2021/130404 | A1 | 7/2021 |

OTHER PUBLICATIONS

Collins, N., "A Comparison of Sound Onset Detection Algorithms with Emphasis on Psychoacoustically Motivated Detection Functions", Audio Engineering Society 118th Convention, Convention Paper 6363, (May 28-31, 2005), 12 pages.

International Search Report and Written Opinion for Patent Cooperation Treaty Application No. PCT/FI2021/050572 dated Jan. 26, 2022, 19 pages.

J. Vilkamo and V. Pulkki, "Adaptive Optimization of Interchannel Coherence with Stereo and Surround Audio Content", J. Audio Eng. Soc., Dec. 2014.

Nokia Corporation, "Description of the IVAS MASA C Reference Software", 3GPP TSG-SA4 #106 Meeting, S4-191167, (Oct. 21-25, 2019), 16 pages.

Nokia Corporation, "Proposal for MASA Common Metadata and Metadata Structure", 3GPP TSG-SA4 #101 Meeting, S4-181353, (Nov. 19-23, 2018), 4 pages.

Search Report for United Kingdom Application No. GB2014771.6 dated Mar. 16, 2021, 3 pages.

Extended European Search Report for European Application No. 21868791.1 dated Jul. 30, 2024, 12 pages.

Office Action for Canadian Application No. 3,193,063 dated Sep. 9, 2024, 6 pages.

Office Action for Chinese Application No. 202180077455.1 dated Jun. 27, 2025, 15 pages.

Office Action for European Application No. 21868791.1 dated Jul. 31, 2025, 5 pages.

* cited by examiner

SPATIAL AUDIO PARAMETER ENCODING AND ASSOCIATED DECODING

CROSS-REFERENCE TO RELATED APPLICATIONS

This application is a national phase entry of International Application No. PCT/FI2021/050572, filed Aug. 25, 2021, which claims priority to Great Britain Application No. 2014771.6, filed Sep. 18, 2020, the contents of which are hereby incorporated by reference in their entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of spatial metadata parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The spatial metadata such as directions and direct-to-total energy ratios in frequency bands are thus a parameterization that is particularly effective for spatial audio capture.

A spatial metadata parameter set consisting of one or more direction value for each frequency band and an energy ratio parameter associated with each direction value can be also utilized as spatial metadata (which may also include other parameters such as spread coherence, number of directions, distance, etc.) for an audio codec. The spatial metadata parameter set may also comprise other parameters or may be associated with other parameters which are considered to be non-directional (such as surround coherence, diffuse-to-total energy ratio, remainder-to-total energy ratio). For example, these parameters can be estimated from microphone-array captured audio signals, and for example a stereo signal can be generated from the microphone array signals to be conveyed with the spatial metadata.

As some codecs are expected to operate at various bit rates ranging from very low bit rates to relatively high bit rates, various strategies are needed for the compression of the spatial metadata to optimize the codec performance for each operating point. The raw bitrate of the encoded parameters (metadata) is relatively high, so especially at lower bitrates it is expected that only the most important parts of the metadata can be conveyed from the encoder to the decoder.

A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, video cameras, VR cameras, stand-alone microphone arrays). However, it may be desirable for such an encoder to have also other input types than microphone-array captured signals, for example, loudspeaker signals, audio object signals, or Ambisonics signals.

SUMMARY

There is provided according to a first aspect an apparatus comprising means configured to: obtain at least one audio signal; obtain, for the at least one audio signal, spatial audio signal parameter values, the spatial audio signal parameters values distributed within a time-frequency domain; determine a merge metric to control a merging of the spatial audio signal parameter values over the time-frequency domain; and merge, based on the merge metric, the spatial audio signal parameter values to a smaller number of spatial audio signal parameter values over time and/or frequency within the time-frequency domain.

The means configured to determine a merge metric to control a merging of the spatial audio signal parameter values over the time-frequency domain may be configured to determine an onset metric for detecting a start of a sound event.

The means configured to determine the onset metric may be configured to: determine an energy parameter for the at least one audio signal over a time period; determine a slow audio signal envelope based on the energy parameter and a slow decay time; determine a fast audio signal envelope based on the energy parameter and a fast decay time; and determine an onset metric based on the slow audio signal envelope and fast audio signal envelope.

The means configured to merge, based on the merge metric, the spatial audio signal parameter values to a smaller number of spatial audio signal parameter values over time and/or frequency within the time-frequency domain may be configured to determine a spatial audio signal parameter value frequency band which best represents spatial audio signal parameter value frequency bands within the time period when the onset metric indicates a start of a sound event.

The means configured to merge, based on the merge metric, the spatial audio signal parameter values to a smaller number of spatial audio signal parameter values over time and/or frequency within the time-frequency domain may be configured to: determine whether, for the determined spatial audio signal parameter value frequency band, an energy ratio of the frequency band is greater than a weighted mean of an energy ratio of frequency bands within the time period; and merge the spatial audio signal parameter values to a smaller number of spatial audio signal parameter values over frequency when the energy ratio of the determined spatial audio signal parameter value frequency band is greater than the weighted mean of the energy ratio of frequency bands within the time period.

The means configured to merge, based on the merge metric, the spatial audio signal parameter values to a smaller number of spatial audio signal parameter values over time and/or frequency within the time-frequency domain may be configured to merge the spatial audio signal parameter values to a smaller number of spatial audio signal parameter values over time when the energy ratio of the determined spatial audio signal parameter value frequency band is less than the weighted mean of the energy ratio of frequency bands within the time period.

The means configured to merge, based on the merge metric, the spatial audio signal parameter values to a smaller number of spatial audio signal parameter values over time and/or frequency within the time-frequency domain may be configured to merge the spatial audio signal parameter values to a smaller number of spatial audio signal parameter values over time when the onset metric indicates an absence of a start of a sound event.

The means may be further configured to encode the merged spatial audio signal parameter values.

The means configured to encode the merged spatial audio signal parameter values may be configured to quantize the merged spatial audio signals parameter values.

The means configured to encode the merged spatial audio signal parameter values may be configured to entropy encode the merged spatial audio signals parameter values. According to a second aspect there is provided an apparatus comprising means configured to: obtain at least one encoded spatial audio signal, the at least one encoded spatial audio signal comprising at least one encoded audio signal, and encoded spatial audio signal parameter values associated with the at least one encoded audio signal; decode the at least one encoded audio signal; decode the encoded spatial audio signal parameter values associated with the at least one encoded audio signal, the encoded spatial audio signal parameter values distributed within a time-frequency domain, the means configured to decode the encoded spatial audio signal parameter values associated with the at least one encoded audio signal is configured to separate out from the encoded spatial audio signal parameter values a larger number of spatial audio signal parameter values over time and/or frequency within the time-frequency domain.

The means configured to separate out from the encoded spatial audio signal parameter values a larger number of spatial audio signal parameter values over time and/or frequency within the time-frequency domain may be configured to identify a previous merging of spatial audio signal parameter values over time and/or frequency and separate out from the encoded spatial audio signal parameter values a larger number of spatial audio signal parameter values over time and/or frequency within the time-frequency domain based on the identification.

The at least one encoded spatial audio signal may further comprise at least one indicator associated with a previous merging, wherein the means configured to identify a previous merging of spatial audio signal parameter values over time and/or frequency and separate out from the encoded spatial audio signal parameter values a larger number of spatial audio signal parameter values over time and/or frequency within the time-frequency domain based on the identification may be configured to separate out from the encoded spatial audio signal parameter values a larger number of spatial audio signal parameter values over time and/or frequency within the time-frequency domain based on the identification based on the at least one indicator.

According to a third aspect there is provided a method comprising: obtaining at least one audio signal; obtaining, for the at least one audio signal, spatial audio signal parameter values, the spatial audio signal parameters values distributed within a time-frequency domain; determining a merge metric to control a merging of the spatial audio signal parameter values over the time-frequency domain; and merging, based on the merge metric, the spatial audio signal parameter values to a smaller number of spatial audio signal parameter values over time and/or frequency within the time-frequency domain.

Determining a merge metric to control a merging of the spatial audio signal parameter values over the time-frequency domain may comprise determining an onset metric for detecting a start of a sound event.

Determining the onset metric may comprise: determining an energy parameter for the at least one audio signal over a time period; determining a slow audio signal envelope based on the energy parameter and a slow decay time; determining a fast audio signal envelope based on the energy parameter and a fast decay time; and determining an onset metric based on the slow audio signal envelope and fast audio signal envelope.

Merging, based on the merge metric, the spatial audio signal parameter values to a smaller number of spatial audio signal parameter values over time and/or frequency within the time-frequency domain may comprise determining a spatial audio signal parameter value frequency band which best represents spatial audio signal parameter value frequency bands within the time period when the onset metric indicates a start of a sound event.

Merging, based on the merge metric, the spatial audio signal parameter values to a smaller number of spatial audio signal parameter values over time and/or frequency within the time-frequency domain may comprise: determining whether, for the determined spatial audio signal parameter value frequency band, an energy ratio of the frequency band is greater than a weighted mean of an energy ratio of frequency bands within the time period; and merging the spatial audio signal parameter values to a smaller number of spatial audio signal parameter values over frequency when the energy ratio of the determined spatial audio signal parameter value frequency band is greater than the weighted mean of the energy ratio of frequency bands within the time period.

Merging, based on the merge metric, the spatial audio signal parameter values to a smaller number of spatial audio signal parameter values over time and/or frequency within the time-frequency domain may comprise merging the spatial audio signal parameter values to a smaller number of spatial audio signal parameter values over time when the energy ratio of the determined spatial audio signal parameter value frequency band is less than the weighted mean of the energy ratio of frequency bands within the time period.

Merging, based on the merge metric, the spatial audio signal parameter values to a smaller number of spatial audio signal parameter values over time and/or frequency within the time-frequency domain may comprise merging the spatial audio signal parameter values to a smaller number of spatial audio signal parameter values over time when the onset metric indicates an absence of a start of a sound event.

The method may further comprise encoding the merged spatial audio signal parameter values.

Encoding the merged spatial audio signal parameter values may comprise quantizing the merged spatial audio signals parameter values.

Encoding the merged spatial audio signal parameter values may comprise entropy encoding the merged spatial audio signals parameter values.

According to a fourth aspect there is provided a method comprising: obtaining at least one encoded spatial audio signal, the at least one encoded spatial audio signal comprising at least one encoded audio signal, and encoded spatial audio signal parameter values associated with the at least one encoded audio signal; decoding the at least one encoded audio signal; decoding the encoded spatial audio signal parameter values associated with the at least one encoded audio signal, the encoded spatial audio signal parameter values distributed within a time-frequency domain, decoding the encoded spatial audio signal parameter values associated with the at least one encoded audio signal comprises separating out from the encoded spatial audio signal parameter values a larger number of spatial audio signal parameter values over time and/or frequency within the time-frequency domain.

Separating out from the encoded spatial audio signal parameter values a larger number of spatial audio signal parameter values over time and/or frequency within the time-frequency domain may comprise identifying a previous merging of spatial audio signal parameter values over time and/or frequency and separate out from the encoded spatial audio signal parameter values a larger number of spatial audio signal parameter values over time and/or frequency within the time-frequency domain based on the identification.

The at least one encoded spatial audio signal may further comprise at least one indicator associated with a previous merging, wherein identifying a previous merging of spatial audio signal parameter values over time and/or frequency and separate out from the encoded spatial audio signal parameter values a larger number of spatial audio signal parameter values over time and/or frequency within the time-frequency domain based on the identification may comprise separating out from the encoded spatial audio signal parameter values a larger number of spatial audio signal parameter values over time and/or frequency within the time-frequency domain based on the identification based on the at least one indicator.

According to a fifth aspect there is provided an apparatus comprising at least one processor and at least one memory including a computer program code, the at least one memory and the computer program code configured to, with the at least one processor, cause the apparatus at least to: obtain at least one audio signal; obtain, for the at least one audio signal, spatial audio signal parameter values, the spatial audio signal parameters values distributed within a time-frequency domain; determine a merge metric to control a merging of the spatial audio signal parameter values over the time-frequency domain; and merge, based on the merge metric, the spatial audio signal parameter values to a smaller number of spatial audio signal parameter values over time and/or frequency within the time-frequency domain.

The apparatus caused to determine a merge metric to control a merging of the spatial audio signal parameter values over the time-frequency domain may be caused to determine an onset metric for detecting a start of a sound event.

The apparatus caused to determine the onset metric may be caused to: determine an energy parameter for the at least one audio signal over a time period; determine a slow audio signal envelope based on the energy parameter and a slow decay time; determine a fast audio signal envelope based on the energy parameter and a fast decay time; and determine an onset metric based on the slow audio signal envelope and fast audio signal envelope.

The apparatus caused to merge, based on the merge metric, the spatial audio signal parameter values to a smaller number of spatial audio signal parameter values over time and/or frequency within the time-frequency domain may be caused to determine a spatial audio signal parameter value frequency band which best represents spatial audio signal parameter value frequency bands within the time period when the onset metric indicates a start of a sound event.

The apparatus caused to merge, based on the merge metric, the spatial audio signal parameter values to a smaller number of spatial audio signal parameter values over time and/or frequency within the time-frequency domain may be caused to: determine whether, for the determined spatial audio signal parameter value frequency band, an energy ratio of the frequency band is greater than a weighted mean of an energy ratio of frequency bands within the time period; and merge the spatial audio signal parameter values to a smaller number of spatial audio signal parameter values over frequency when the energy ratio of the determined spatial audio signal parameter value frequency band is greater than the weighted mean of the energy ratio of frequency bands within the time period.

The apparatus caused to merge, based on the merge metric, the spatial audio signal parameter values to a smaller number of spatial audio signal parameter values over time and/or frequency within the time-frequency domain may be caused to merge the spatial audio signal parameter values to a smaller number of spatial audio signal parameter values over time when the energy ratio of the determined spatial audio signal parameter value frequency band is less than the weighted mean of the energy ratio of frequency bands within the time period.

The apparatus caused to merge, based on the merge metric, the spatial audio signal parameter values to a smaller number of spatial audio signal parameter values over time and/or frequency within the time-frequency domain may be caused to merge the spatial audio signal parameter values to a smaller number of spatial audio signal parameter values over time when the onset metric indicates an absence of a start of a sound event.

The apparatus may be further caused to encode the merged spatial audio signal parameter values.

The apparatus caused to encode the merged spatial audio signal parameter values may be caused to quantize the merged spatial audio signals parameter values.

The apparatus caused to encode the merged spatial audio signal parameter values may be caused to entropy encode the merged spatial audio signals parameter values.

According to a sixth aspect there is provided an apparatus comprising at least one processor and at least one memory including a computer program code, the at least one memory and the computer program code configured to, with the at least one processor, cause the apparatus at least to: obtain at least one encoded spatial audio signal, the at least one encoded spatial audio signal comprising at least one encoded audio signal, and encoded spatial audio signal parameter values associated with the at least one encoded audio signal; decode the at least one encoded audio signal; decode the encoded spatial audio signal parameter values associated with the at least one encoded audio signal, the encoded spatial audio signal parameter values distributed within a time-frequency domain, the apparatus caused to decode the encoded spatial audio signal parameter values associated with the at least one encoded audio signal is caused to separate out from the encoded spatial audio signal parameter values a larger number of spatial audio signal parameter values over time and/or frequency within the time-frequency domain.

The apparatus caused to separate out from the encoded spatial audio signal parameter values a larger number of spatial audio signal parameter values over time and/or frequency within the time-frequency domain may be caused to identify a previous merging of spatial audio signal parameter values over time and/or frequency and separate out from the encoded spatial audio signal parameter values a larger number of spatial audio signal parameter values over time and/or frequency within the time-frequency domain based on the identification.

The at least one encoded spatial audio signal may further comprise at least one indicator associated with a previous merging, wherein the apparatus caused to identify a previous merging of spatial audio signal parameter values over time and/or frequency and separate out from the encoded spatial audio signal parameter values a larger number of spatial audio signal parameter values over time and/or frequency within the time-frequency domain based on the identification may be caused to separate out from the encoded spatial audio signal parameter values a larger number of spatial audio signal parameter values over time and/or frequency within the time-frequency domain based on the identification based on the at least one indicator.

According to a seventh aspect there is provided an apparatus comprising: means for obtaining at least one audio signal; means for obtaining, for the at least one audio signal, spatial audio signal parameter values, the spatial audio signal parameters values distributed within a time-frequency domain; means for determining a merge metric to control a merging of the spatial audio signal parameter values over the time-frequency domain; and means for merging, based on the merge metric, the spatial audio signal parameter values to a smaller number of spatial audio signal parameter values over time and/or frequency within the time-frequency domain.

According to an eighth aspect there is provided an apparatus comprising: means for obtaining at least one encoded spatial audio signal, the at least one encoded spatial audio signal comprising at least one encoded audio signal, and encoded spatial audio signal parameter values associated with the at least one encoded audio signal; means for decoding the at least one encoded audio signal; means for decoding the encoded spatial audio signal parameter values associated with the at least one encoded audio signal, the encoded spatial audio signal parameter values distributed within a time-frequency domain, the means for decoding the encoded spatial audio signal parameter values associated with the at least one encoded audio signal for separating out from the encoded spatial audio signal parameter values a larger number of spatial audio signal parameter values over time and/or frequency within the time-frequency domain.

According to a ninth aspect there is provided a computer program comprising instructions [or a computer readable medium comprising program instructions] for causing an apparatus to perform at least the following: obtain at least one audio signal; obtain, for the at least one audio signal, spatial audio signal parameter values, the spatial audio signal parameters values distributed within a time-frequency domain; determine a merge metric to control a merging of the spatial audio signal parameter values over the time-frequency domain; and merge, based on the merge metric, the spatial audio signal parameter values to a smaller number of spatial audio signal parameter values over time and/or frequency within the time-frequency domain.

According to a tenth aspect there is provided a computer program comprising instructions [or a computer readable medium comprising program instructions] for causing an apparatus to perform at least the following: obtaining at least one encoded spatial audio signal, the at least one encoded spatial audio signal comprising at least one encoded audio signal, and encoded spatial audio signal parameter values associated with the at least one encoded audio signal; decoding the at least one encoded audio signal; decoding the encoded spatial audio signal parameter values associated with the at least one encoded audio signal, the encoded spatial audio signal parameter values distributed within a time-frequency domain, decoding the encoded spatial audio signal parameter values associated with the at least one encoded audio signal comprises separating out from the encoded spatial audio signal parameter values a larger number of spatial audio signal parameter values over time and/or frequency within the time-frequency domain.

According to an eleventh aspect there is provided a non-transitory computer readable medium comprising program instructions for causing an apparatus to perform at least the following: obtain at least one audio signal; obtain, for the at least one audio signal, spatial audio signal parameter values, the spatial audio signal parameters values distributed within a time-frequency domain; determine a merge metric to control a merging of the spatial audio signal parameter values over the time-frequency domain; and merge, based on the merge metric, the spatial audio signal parameter values to a smaller number of spatial audio signal parameter values over time and/or frequency within the time-frequency domain.

According to a twelfth aspect there is provided a non-transitory computer readable medium comprising program instructions for causing an apparatus to perform at least the following: obtain at least one encoded spatial audio signal, the at least one encoded spatial audio signal comprising at least one encoded audio signal, and encoded spatial audio signal parameter values associated with the at least one encoded audio signal; decode the at least one encoded audio signal; decode the encoded spatial audio signal parameter values associated with the at least one encoded audio signal, the encoded spatial audio signal parameter values distributed within a time-frequency domain, wherein the apparatus caused to decode the encoded spatial audio signal parameter values associated with the at least one encoded audio signal comprises separating out from the encoded spatial audio signal parameter values a larger number of spatial audio signal parameter values over time and/or frequency within the time-frequency domain.

According to a thirteenth aspect there is provided an apparatus comprising: obtaining circuitry configured to obtain at least one audio signal; obtaining circuitry configured to obtain, for the at least one audio signal, spatial audio signal parameter values, the spatial audio signal parameters values distributed within a time-frequency domain; determining circuitry configured to determine a merge metric to control a merging of the spatial audio signal parameter values over the time-frequency domain; and merging configured to merge, based on the merge metric, the spatial audio signal parameter values to a smaller number of spatial audio signal parameter values over time and/or frequency within the time-frequency domain.

According to a fourteenth aspect there is provided an apparatus comprising: obtaining circuitry configured to obtain at least one encoded spatial audio signal, the at least one encoded spatial audio signal comprising at least one encoded audio signal, and encoded spatial audio signal parameter values associated with the at least one encoded audio signal; decoding circuitry configured to decode the at least one encoded audio signal; decoding circuitry configured to decode the encoded spatial audio signal parameter values associated with the at least one encoded audio signal, the encoded spatial audio signal parameter values distributed within a time-frequency domain, wherein the decoding circuitry configured to decode the encoded spatial audio signal parameter values associated with the at least one encoded audio signal comprises separating circuitry configured to separate out from the encoded spatial audio signal parameter values a larger number of spatial audio signal parameter values over time and/or frequency within the time-frequency domain.

According to a fifteenth aspect there is provided a computer readable medium comprising program instructions for causing an apparatus to perform at least the following: obtaining at least one audio signal; obtain, for the at least one audio signal, spatial audio signal parameter values, the spatial audio signal parameters values distributed within a time-frequency domain; determining a merge metric to control a merging of the spatial audio signal parameter values over the time-frequency domain; and merging, based on the merge metric, the spatial audio signal parameter values to a smaller number of spatial audio signal parameter values over time and/or frequency within the time-frequency domain.

According to a sixteenth aspect there is provided a computer readable medium comprising program instructions for causing an apparatus to perform at least the following: obtaining at least one encoded spatial audio signal, the at least one encoded spatial audio signal comprising at least one encoded audio signal, and encoded spatial audio signal parameter values associated with the at least one encoded audio signal; decoding the at least one encoded audio signal; decoding the encoded spatial audio signal parameter values associated with the at least one encoded audio signal, the encoded spatial audio signal parameter values distributed within a time-frequency domain, decoding the encoded spatial audio signal parameter values associated with the at least one encoded audio signal comprises separating out from the encoded spatial audio signal parameter values a larger number of spatial audio signal parameter values over time and/or frequency within the time-frequency domain.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
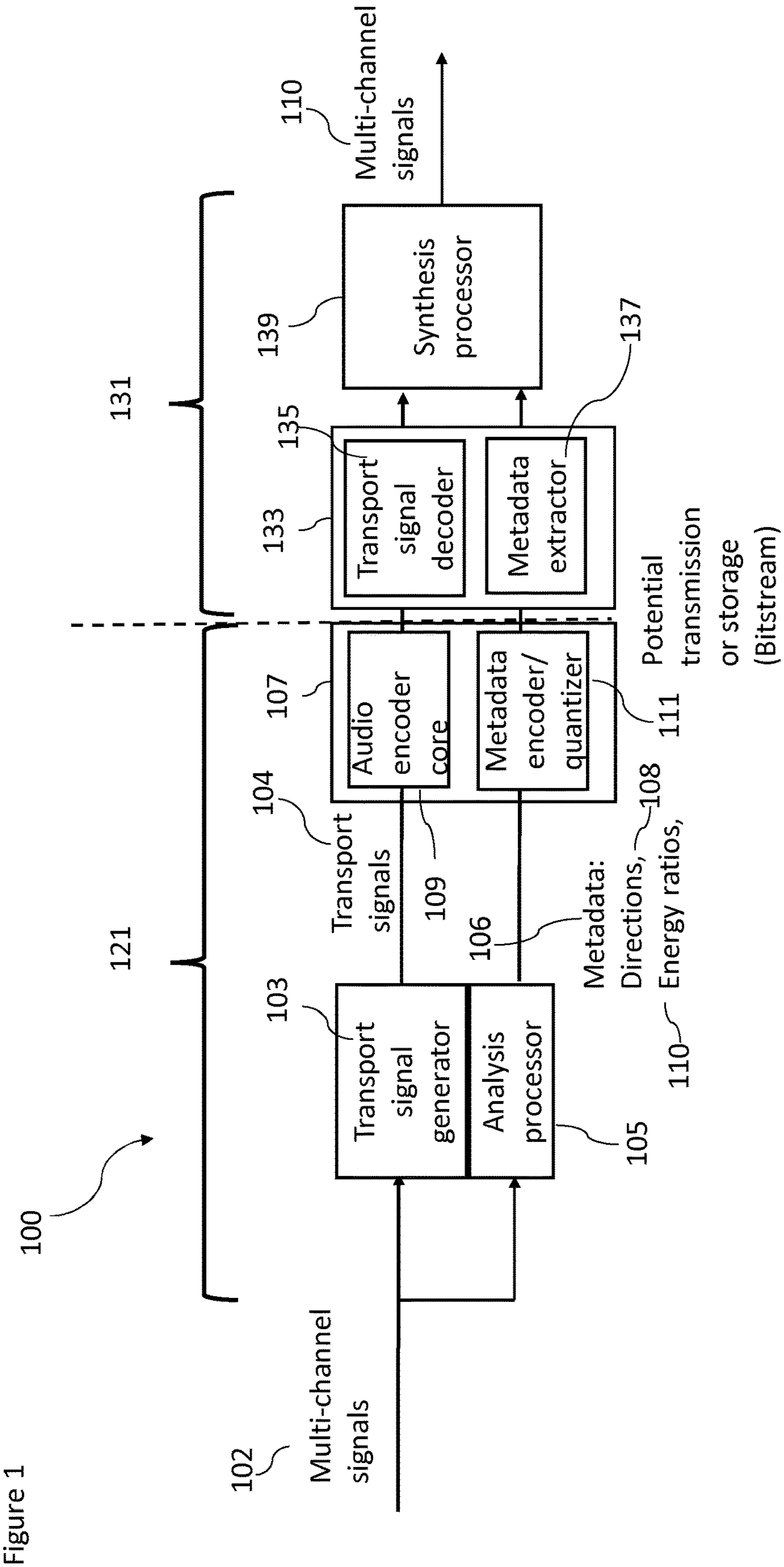
FIG. 1 shows schematically a system of apparatus suitable for implementing some embodiments.

The following describes in further detail suitable apparatus and possible mechanisms for the encoding of parametric spatial audio streams with transport audio signals and spatial metadata. In the following discussions a multi-channel system is discussed with respect to a multi-channel microphone implementation. However as discussed above the input format may be any suitable input format, such as multi-channel loudspeaker, Ambisonics (FOA/HOA) etc. It is understood that in some embodiments the channel location is based on a location of the microphone or is a virtual location or direction.

Furthermore in the following examples the output of the example system is a multi-channel loudspeaker arrangement. In other embodiments the output may be rendered to the user via means other than loudspeakers. The multi-channel loudspeaker signals may be also generalised to be two or more playback audio signals.

Metadata-Assisted Spatial Audio (MASA) is a parametric spatial audio format and representation. It can be considered an audio representation consisting of 'N channels+spatial metadata'. It is a scene-based audio format particularly suited for spatial audio capture on practical devices, such as smartphones. The idea is to describe the sound scene in terms of time- and frequency-varying sound source directions. Sound energy that is not defined (described) by the directions, is described as diffuse (coming from all directions).

As discussed above spatial metadata associated with the audio signals may comprise multiple parameters (such as multiple directions and associated with each direction a direct-to-total ratio, distance, etc.) per time-frequency tile. The spatial metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the spatial metadata comprises one or more directions for each time-frequency subframe (and associated with each direction direct-to-total ratios, distance values etc) are determined. However as also discussed above, bandwidth and/or storage limitations may require a codec not to send spatial metadata parameter values for each frequency band and temporal sub-frame.

As described above, parametric spatial metadata representation can use multiple concurrent spatial directions. With MASA, the proposed maximum number of concurrent directions is two. For each concurrent direction, there may be associated parameters such as: Direction index; Direct-to-total ratio; Spread coherence; Diffuse-to-total energy ratio; Surround coherence; Remainder-to-total energy ratio and Distance.

The direction index may be encoded using a number of bits, for example 16, which defines a direction of arrival of the sound at a time-frequency parameter interval. In some embodiments the encoding using spherical representation with 16 bits enables a direction with about 1-degree accuracy where all directions are covered. Direct-to-total ratios describe how much of energy comes from specific directions and may be calculated as energy in the direction against the total energy. The Spread coherence represents a spread of energy associated with a direction index of a time-frequency tile (i.e., a measure of a ‘concentration of energy’ for a time-frequency subframe direction and defines whether the direction is to be reproduced as a point source or coherently around the direction). A diffuse-to-total energy ratio defines an energy ratio of non-directional sound over surrounding directions and may be calculated as energy of non-directional sound against the total energy and describes how much of the energy does not come from any specific direction. The direct-to-total energy ratio(s) and the diffuse-to-total sum to one (if there is no remainder energy present). The surround coherence describes the coherence of the non-directional sound over the surrounding directions. A remainder-to-total energy ratio defines the energy ratio of the remainder (such as microphone noise) sound energy and fulfils the requirement that the sum of energy ratios is 1. The Distance parameter defines the distance of the sound originating from the direction index. It may be defined in terms of time-frequency subframes and in meters on a logarithmic scale and may define a range of values, for example, 0 to 100 m.

However the MASA format may further comprise other parameters, such as:

Version which describes the incremental version number for the MASA metadata format.

Channel audio format which describes the following fields (and may be stored as two bytes):

Number of directions which indicates the number of directions in the metadata, where each direction is associated with a set of direction dependent spatial metadata;

Number of channels which indicates a number of transport channels in the format;

Transport channel definition which describes the transport channels.

Source format which describes the original format from which the audio signals was created;

Source format description which may provide further description of the specific source format; and Channel distance which describes the channel distance.

The IVAS codec is an extension of the 3GPP EVS codec and is intended for new immersive voice and audio services over 4G/5G. Such immersive services include, e.g., immersive voice and audio for virtual reality (VR). The multi-purpose audio codec is expected to handle the encoding, decoding and rendering of speech, music and generic audio. It is expected to support channel-based audio and scene-based audio inputs including spatial information about the sound field and sound sources. It is also expected to operate with low latency to enable conversational services as well as support high error robustness under various transmission conditions.

As the IVAS codec is expected to operate at various bit rates ranging from very low bit rates (13 kb/s) to relatively high bit rates (500 kb/s), various strategies are needed for compression of the spatial metadata. The raw bitrate of the MASA metadata is relatively high (about 310 kb/s for 1 direction and about 500 kb/s for 2 directions), so at lower bitrates it is expected that only the most important parts of the metadata will be conveyed from the encoder to the decoder. In practice, it is not possible to send parameter values for each frequency band, temporal sub-frame, and direction (at least for most practical bit rates). Instead, some values have to be merged (e.g., send only 1 direction instead of 2 directions and/or send the same direction(s) for multiple frequency bands and/or temporal sub-frames). At absolute lowest bitrates, drastic reduction is needed as there is very few bits available for describing the metadata.

For example at the very low audio bitrates (13.2 kb/s to 32 kb/s), there are very few bits available for coding metadata. For example, at 16.4 kb/s stereo MASA, to maintain quality of the audio signal(s) or transport signal(s), the available bitrate for metadata may be as low as 3 kb/s. As the raw bitrate for even a 1 direction MASA metadata is about 310 kb/s, the reduction is significant.

Although it may be possible to reduce the frequency bands and subframes to a lower number, even sending just direction and direct-to-total energy ratio parameters with a reasonable accuracy and TF-resolution (e.g., 5 frequency bands and 4 subframes, i.e., 20 time-frequency tiles), to encode the parameters (depending on the metadata values) to fit into about 60 bits per frame as the above bitrate it may not always provide good quality depending on the content of the spatial audio. Apparatus and methods to obtain these significant reductions without losing quality are currently being researched. The concept as discussed by the following embodiments is the provision of apparatus and methods configured to control and select a reduction method for each metadata frame in order to obtain a good quality output.

Thus for example in some embodiments there is provided apparatus and methods configured to select between single subframe and single frequency band metadata representations. In some embodiments the control mechanism or selection is based on an onset detection or determination operation. The onset detection or determination operation being implemented based on forming metrics which can be compared to threshold values. The metrics themselves can in some embodiments be formed based on an analysis of parametric parameters such as the direct-to-total energy ratio(s) and the signal energy/energies.

With respect to FIG. 1 an example apparatus and system for implementing embodiments of the application are shown. The system 100 is shown with an ‘analysis’ part 121 and a ‘synthesis’ part 131. The ‘analysis’ part 121 is the part from receiving the multi-channel signals up to an encoding of the spatial metadata and transport signal and the ‘synthesis’ part 131 is the part from a decoding of the encoded spatial metadata and transport signal to the presentation of the re-generated signal (for example in multi-channel loudspeaker form).

In the following description the ‘analysis’ part 121 is described as a series of parts however in some embodiments the part may be implemented as functions within the same functional apparatus or part. In other words in some embodiments the ‘analysis’ part 121 is an encoder comprising at least one of the transport signal generator or analysis processor as described hereafter.

The input to the system 100 and the ‘analysis’ part 121 is the multi-channel signals 102. The ‘analysis’ part 121 may comprise a transport signal generator 103, analysis processor 105, and encoder 107. In the following examples a microphone channel signal input is described, which can be two or more microphones integrated or connected onto a mobile device (e.g., a smartphone). However any suitable input (or synthetic multi-channel) format may be implemented in other embodiments. For example other suitable audio signals format inputs could be microphone arrays, e.g., B-format microphone, planar microphone array or Eigenmike, Ambisonic signals, e.g., first-order Ambisonics (FOA), higher-order Ambisonics (HOA), loudspeaker surround mix and/or objects, artificially created spatial mix, e.g., from audio or VR teleconference bridge, or combinations of the above.

The multi-channel signals are passed to a transport signal generator 103 and to an analysis processor 105.

In some embodiments the transport signal generator 103 is configured to receive the multi-channel signals and generate a suitable audio signal format for encoding. The transport signal generator 103 can for example generate a stereo or mono audio signal. The transport audio signals generated by the transport signal generator can be any known format. For example when the input is one where the audio signals input are mobile phone microphone array audio signals, the transport signal generator 103 can be configured to select a left-right microphone pair, and apply any suitable processing to the audio signal pair, such as automatic gain control, microphone noise removal, wind noise removal, and equalization. In some embodiments when the input is a first order Ambisonic/higher order Ambisonic (FOA/HOA) signal, the transport signal generator can be configured to formulate directional beam signals towards left and right directions, such as two opposing cardioid signals. Additionally in some embodiments when the input is a loudspeaker surround mix and/or objects, then the transport signal generator 103 can be configured to generate a downmix signal that combines left side channels to a left downmix channel, combined right side channels to a right downmix channel and adds centre channels to both transport channels with a suitable gain.

In some embodiments the transport signal generator is bypassed (or in other words is optional). For example, in some situations where the analysis and synthesis occur at the same device at a single processing step, without intermediate processing there is no transport signal generation and the input audio signals are passed unprocessed. The number of transport channels generated can be any suitable number and not for example one or two channels.

The output of the transport signal generator 103 can be passed to an encoder 107.

In some embodiments the analysis processor 105 is also configured to receive the multi-channel signals and analyse the signals to produce the spatial metadata 106 associated with the multi-channel signals and thus associated with the transport signals 104. In some embodiments the spatial metadata associated with the audio signals may be a provided to the encoder as a separate bit-stream. In some embodiments the multichannel signals 102 input comprises spatial metadata and this is passed directly to the encoder 107.

The analysis processor 105 may be configured to generate the spatial metadata parameters which may comprise, for each time-frequency analysis interval, at least one direction parameter 108 and at least one energy ratio parameter 110 (and in some embodiments other parameters such as described earlier and of which a non-exhaustive list includes number of directions, surround coherence, diffuse-to-total energy ratio, remainder-to-total energy ratio, a spread coherence parameter, and distance parameter). The direction parameter may be represented in any suitable manner, for example as spherical co-ordinates denoted as azimuth $\varphi(k,n)$ and elevation $\theta(k,n)$.

In some embodiments the number of the spatial metadata parameters may differ from time-frequency tile to time-frequency tile. Thus for example in band X all of the spatial metadata parameters are obtained (generated) and transmitted, whereas in band Y only one of the spatial metadata parameters is obtained and transmitted, and furthermore in band Z no parameters are obtained or transmitted. A practical example of this may be that for some time-frequency tiles corresponding to the highest frequency band some of the spatial metadata parameters are not required for perceptual reasons. The spatial metadata 106 may be passed to an encoder 107.

In some embodiments the analysis processor 105 is configured to apply a time-frequency transform for the input signals. Then, for example, in time-frequency tiles when the input is a mobile phone microphone array, the analysis processor could be configured to estimate delay-values between microphone pairs that maximize the inter-microphone correlation. Then based on these delay values the analysis processor may be configured to formulate a corresponding direction value for the spatial metadata. Furthermore the analysis processor may be configured to formulate a direct-to-total ratio parameter based on the correlation value.

In some embodiments, for example where the input is a FOA signal, the analysis processor 105 can be configured to determine an intensity vector. The analysis processor may then be configured to determine a direction parameter value for the spatial metadata based on the intensity vector. A diffuse-to-total ratio can then be determined, from which a direct-to-total ratio parameter value for the spatial metadata can be determined. This analysis method is known in the literature as Directional Audio Coding (DirAC).

In some examples, for example where the input is a HOA signal, the analysis processor 105 can be configured to divide the HOA signal into multiple sectors, in each of which the method above is utilized. This sector-based method is known in the literature as higher order DirAC (HO-DirAC). In these examples, there is more than one simultaneous direction parameter value per time-frequency tile corresponding to the multiple sectors.

Additionally in some embodiments where the input is a loudspeaker surround mix and/or audio object(s) based signal, the analysis processor can be configured to convert the signal into a FOA/HOA signal(s) format and to obtain direction and direct-to-total ratio parameter values as above.

The encoder 107 may comprise an audio encoder core 109 which is configured to receive the transport audio signals 104 and generate a suitable encoding of these audio signals. The encoder 107 can in some embodiments be a computer (running suitable software stored on memory and on at least one processor), or alternatively a specific device utilizing, for example, FPGAs or ASICs. The audio encoding may be implemented using any suitable scheme.

The encoder 107 may furthermore comprise a spatial metadata encoder/quantizer 111 which is configured to receive the spatial metadata and output an encoded or compressed form of the information. In some embodiments the encoder 107 may further interleave, multiplex to a single data stream or embed the spatial metadata within encoded downmix signals before transmission or storage shown in FIG. 1 by the dashed line. The multiplexing may be implemented using any suitable scheme.

In some embodiments the transport signal generator 103 and/or analysis processor 105 may be located on a separate device (or otherwise separate) from the encoder 107. For example in such embodiments the spatial metadata (and associated non-spatial metadata) parameters associated with the audio signals may be a provided to the encoder as a separate bit-stream.

In some embodiments the transport signal generator 103 and/or analysis processor 105 may be part of the encoder 107, i.e., located inside of the encoder and be on a same device.

In the following description the 'synthesis' part 131 is described as a series of parts however in some embodiments the part may be implemented as functions within the same functional apparatus or part.

In the decoder side, the received or retrieved data (stream) may be received by a decoder/demultiplexer 133. The decoder/demultiplexer 133 may demultiplex the encoded streams and pass the audio encoded stream to a transport signal decoder 135 which is configured to decode the audio signals to obtain the transport audio signals. Similarly the decoder/demultiplexer 133 may comprise a metadata extractor 137 which is configured to receive the encoded spatial metadata (for example a direction index representing a direction parameter value) and generate spatial metadata.

The decoder/demultiplexer 133 can in some embodiments be a computer (running suitable software stored on memory and on at least one processor), or alternatively a specific device utilizing, for example, FPGAs or ASICs.

The decoded metadata and transport audio signals may be passed to a synthesis processor 139.

The system 100 'synthesis' part 131 further shows a synthesis processor 139 configured to receive the transport audio signal and the spatial metadata and re-creates in any suitable format a synthesized spatial audio in the form of multi-channel signals 110 (these may be multichannel loudspeaker format or in some embodiments any suitable output format such as binaural or Ambisonics signals, depending on the use case) based on the transport signals and the spatial metadata.

The synthesis processor 139 thus creates the output audio signals, e.g., multichannel loudspeaker signals or binaural signals based on any suitable known method. This is not explained here in further detail. However, as a simplified example, the rendering can be performed for loudspeaker output according to any of the following methods. For example the transport audio signals can be divided to direct and ambient streams based on the direct-to-total and diffuse-to-total energy ratios. The direct stream can then be rendered based on the direction parameter(s) using amplitude panning. The ambient stream can furthermore be rendered using decorrelation. The direct and the ambient streams can then be combined.

The output signals can be reproduced using a multichannel loudspeaker setup or headphones which may be head-tracked.

It should be noted that the processing blocks of FIG. 1 can be located in same or different processing entities. For example, in some embodiments, microphone signals from a mobile device are processed with a spatial audio capture system (containing the analysis processor and the transport signal generator), and the resulting spatial metadata and transport audio signals (e.g., in the form of a MASA stream) are forwarded to an encoder (e.g., an IVAS encoder), which contains the encoder. In other embodiments, input signals (e.g., 5.1 channel audio signals) are directly forwarded to an encoder (e.g., an IVAS encoder), which contains the analysis processor, the transport signal generator, and the encoder.

In some embodiments there can be two (or more) input audio signals, where the first audio signal is processed by the apparatus shown in FIG. 1 (resulting in data as an input for the encoder) and the second audio signal is directly forwarded to an encoder (e.g., an IVAS encoder), which contains the analysis processor, the transport signal generator, and the encoder. The audio input signals may then be encoded in the encoder independently or they may, e.g., be combined in the parametric domain according to what may be called, e.g., MASA mixing.

In some embodiments there may be a synthesis part which comprises separate decoder and synthesis processor entities or apparatus, or the synthesis part can comprise a single entity which comprises both the decoder and the synthesis processor. In some embodiments, the decoder block may process in parallel more than one incoming data stream. In the application the term synthesis processor may be interpreted as an internal or external renderer.

Therefore in summary first the system (analysis part) is configured to receive multi-channel audio signals. Then the system (analysis part) is configured to generate a suitable transport audio signal (for example by selecting some of the audio signal channels). The system is then configured to encode for storage/transmission the transport audio signal. After this the system may store/transmit the encoded transport audio signal and metadata. The system may retrieve/receive the encoded transport audio signal and metadata. Then the system is configured to extract the transport audio signal and metadata from encoded transport audio signal and metadata parameters, for example demultiplex and decode the encoded transport audio signal and metadata parameters.

The system (synthesis part) is configured to synthesize an output multi-channel audio signal based on extracted transport audio signal and metadata.

Figure 2:
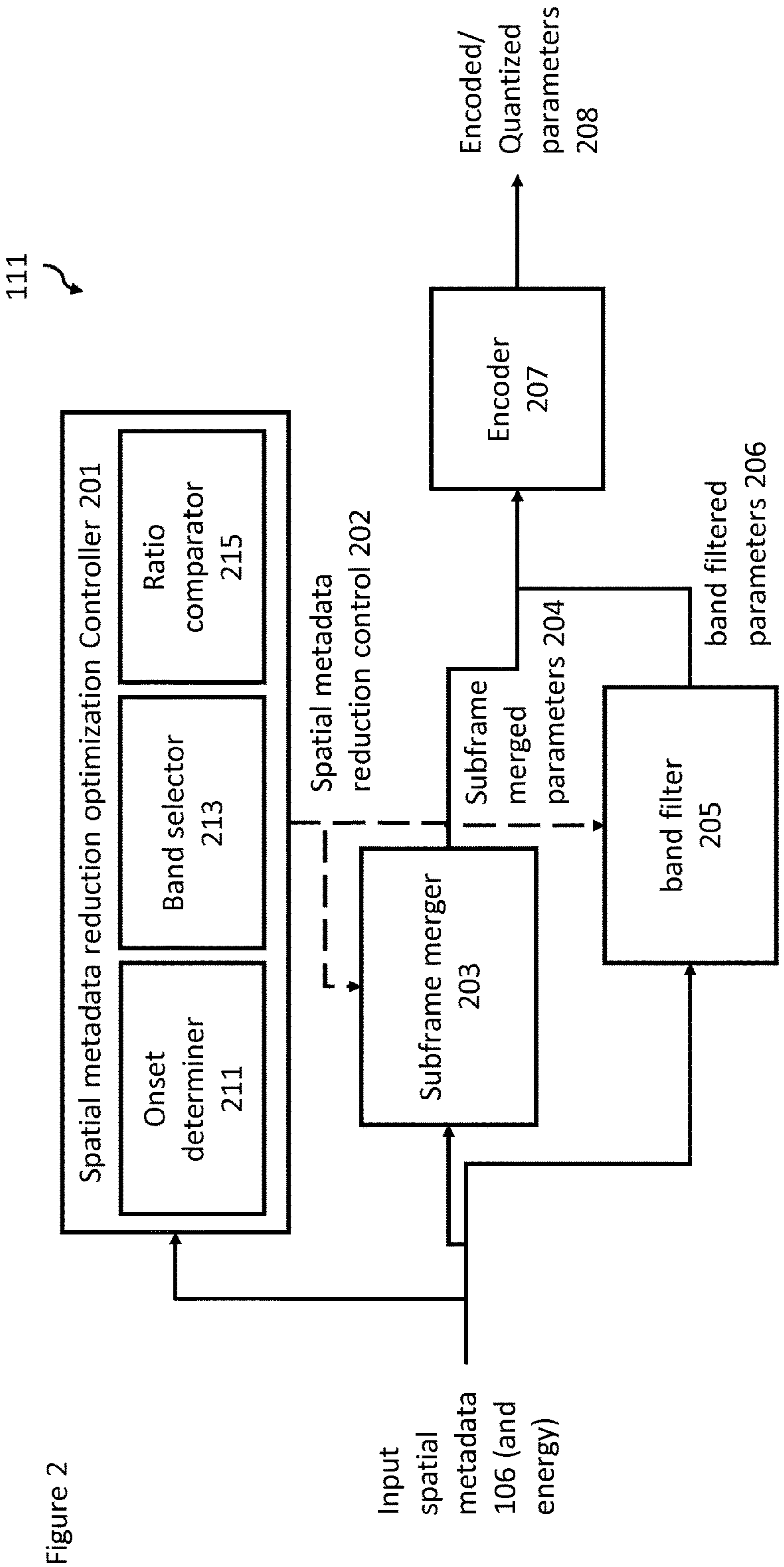
FIG. 2 shows schematically the metadata encoder according to some embodiments.

With respect to FIG. 2 an example spatial metadata encoder/quantizer 111 (as shown in FIG. 1) according to some embodiments is described in further detail.

The input to the metadata encoder/quantizer 111 in some embodiments comprises spatial metadata 106 and energy parameters. In other words the spatial metadata (containing at least the direct-to-total energy ratio r(k,n)) is obtained and also the energy E(k,n) is obtained in the same resolution as the metadata (k is the frequency band index and n the temporal subframe index).

In some embodiments the energy E(k,n) may have been computed in the analysis processor 105 from the time-frequency domain multi-channel signals by $$E(k, n) = \sum_{i} \sum_{b_{k,low}}^{b_{k,high}} |S(i, b, n)|^2$$

As the process is intended for very low bitrates the spatial metadata may already be in a relatively low-resolution form. For example in some embodiments the spatial metadata is in the format of spatial metadata parameters in in the form of parameters in 5 frequency bands and 4 subframes per directional component. In some embodiments energy ratios (such as direct-to-total ratio) can be already represented with full frame time-resolution instead of 4 subframe resolution. In other words there is a single parameter value for the full frame for the energy ratios rather than separate sub-frame parameter values.

The input spatial metadata and the energy parameters may in some embodiments be passed to a spatial metadata reduction optimization controller, or more generally a controller, 201.

The controller 201 in some embodiments comprises an onset determiner 211. The onset determiner 211 is configured to determine when a short-term energy is significantly higher than long-term energy. The determination of short-term energy being significantly higher than long-term energy indicates a potential start of a sound event and thus are perceptually important in defining the perceived direction and timbre of the sound event.

Where there is no determined onset, then potentially the sound scene is generally "slowly" changing and a fast time resolution is less important. This means that time resolution can be traded for better frequency resolution and merging may be implemented over time rather than over frequency.

However, when it is determined that there is an onset, then a faster time resolution is important to catch and characterize the sound scene change as well as possible. In this case, frequency resolution may be traded (if it is possible to represent the onset well by using just a single band) for time resolution.

Figure 4:
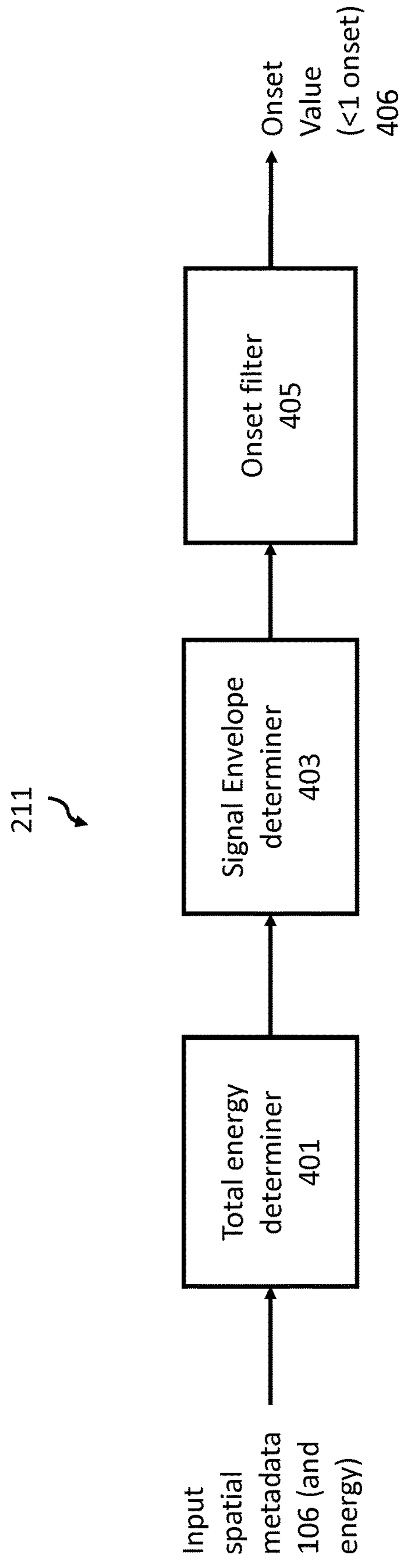
FIG. 4 shows schematically the onset determiner as shown in FIG. 2 according to some embodiments.
Figure 5:
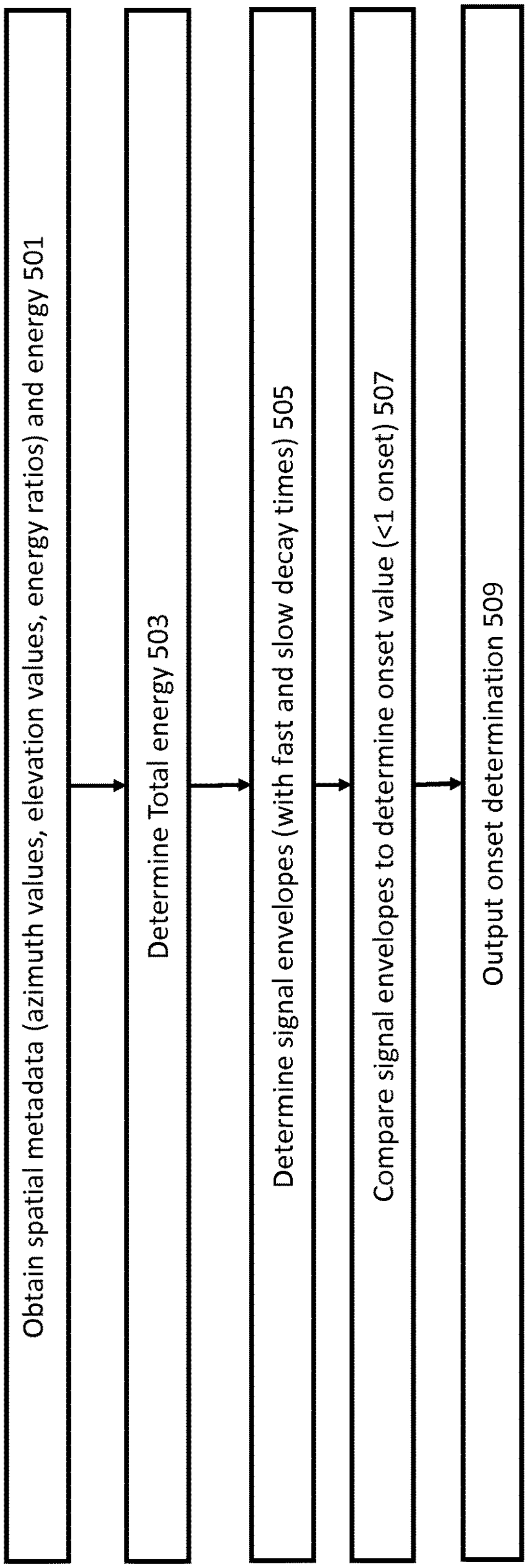
FIG. 5 shows a flow diagram of the operation of the onset determiner as shown in FIG. 4 according to some embodiments.

With respect to FIGS. 4 and 5 is shown an example onset determiner 211 and the operations of the example onset determiner 211 respectively. In some other embodiments a different but suitable onset determiner may be implemented to detect or determine the occurrence of an onset.

The onset determiner 211 in some embodiments is configured to obtain the spatial metadata and energy parameters as shown in FIG. 5 by step 501.

In some embodiments the onset determiner 211 comprises a total energy determiner 401. The total energy determiner is configured to sum the energy parameter over all frequency bands and temporal subframes, yielding the total energy for the frame (in this example m is the index of the temporal frame, containing 4 subframes).

$$E_{tot}(m) = \sum_k \sum_n E(k, n)$$

The total energy values can then be forwarded to a signal envelope determiner 403. The operation of obtaining the total energy values is shown in FIG. 5 by step 503.

In some embodiments the onset determiner 211 comprises a signal envelope determiner 403. The signal envelope determiner 403 is configured to determine two signal envelopes, one with a fast decay time and one with a slow decay time. For example the signal envelopes may be:

$$E_\alpha(m)=\max(\alpha E_\alpha(m-1), E_{tot}(m))$$

$$E_\beta(m)=\gamma \min(E_\alpha(m), \beta E_\beta(m-1)+(1-\beta)E_\alpha(m))$$

where $\alpha$ and $\beta$ are coefficients (between 0 and 1) determining the rate of the exponential decay, and $\gamma$ is a gain (>1) for preventing false detection of onsets in stationary signals.

In these examples the envelope $E_\beta(m)$ reacts slower to changes than $E_\alpha(m)$. The envelopes may be passed to an onset filter 405

The determination of the signal envelopes is shown in FIG. 5 by step 505.

In some embodiments the onset determiner 211 comprises an onset filter 405. The onset filter 405 can be configured to receive the envelopes and can be implemented as:

$$o(m) = \min\left(1, \frac{E_\beta(m)}{E_\alpha(m)}\right)$$

The output of the onset filter may then be used to determine whether the onset is occurring. For example if the onset filter o(m) has a value smaller than 1, then the frame m can be determined to contain an onset. Otherwise, the frame can be determined not to contain an onset. The comparison of the envelopes to determine an onset value is shown in FIG. 5 by step 507.

The onset value (or determination) may furthermore be then configured to be output as shown in FIG. 5 by step 509.

Figure 3:
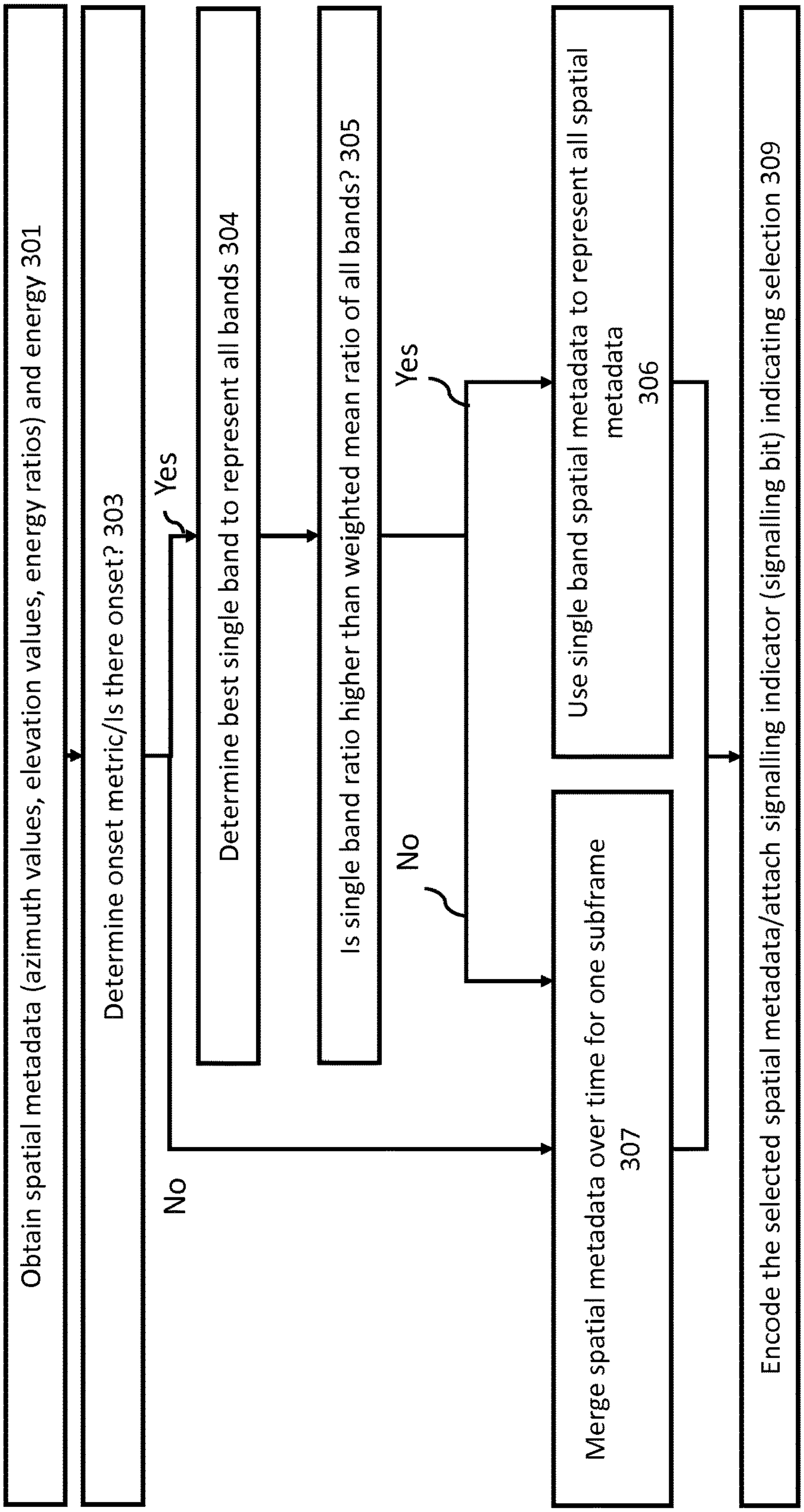
FIG. 3 show a flow diagram of the operation of the example metadata encoder as shown in FIG. 2 according to some embodiments.

The operation of determining an onset metric and furthermore determining whether there is an onset is shown in FIG. 3 by step 303.

The controller 201 in some embodiments comprises a band selector 213. The band selector 213 in some embodiments is configured, when there is an onset determined or detected, to attempt to find a suitable single band of spatial metadata to represent metadata for all bands.

Figure 6:
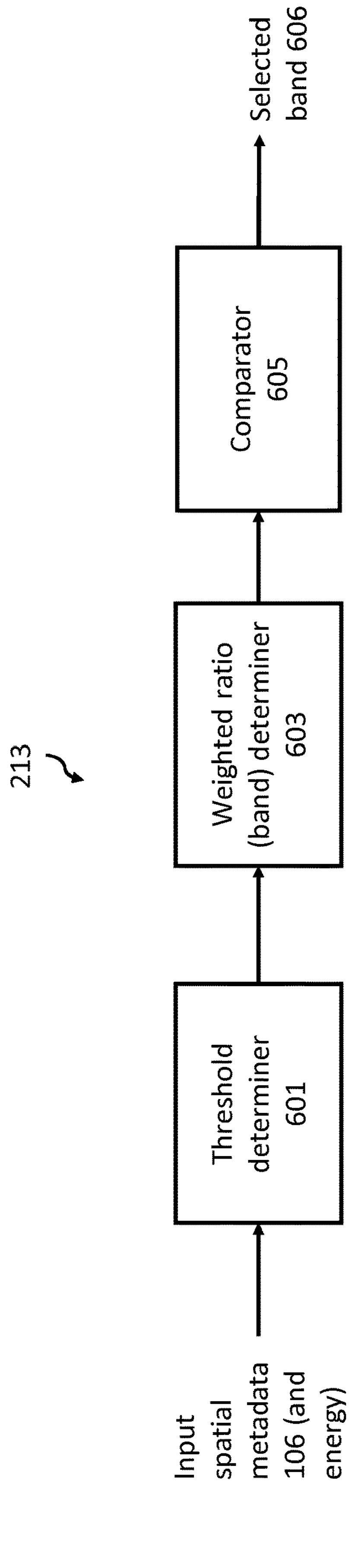
FIG. 6 shows schematically the band selector as shown in FIG. 2 according to some embodiments.
Figure 7:
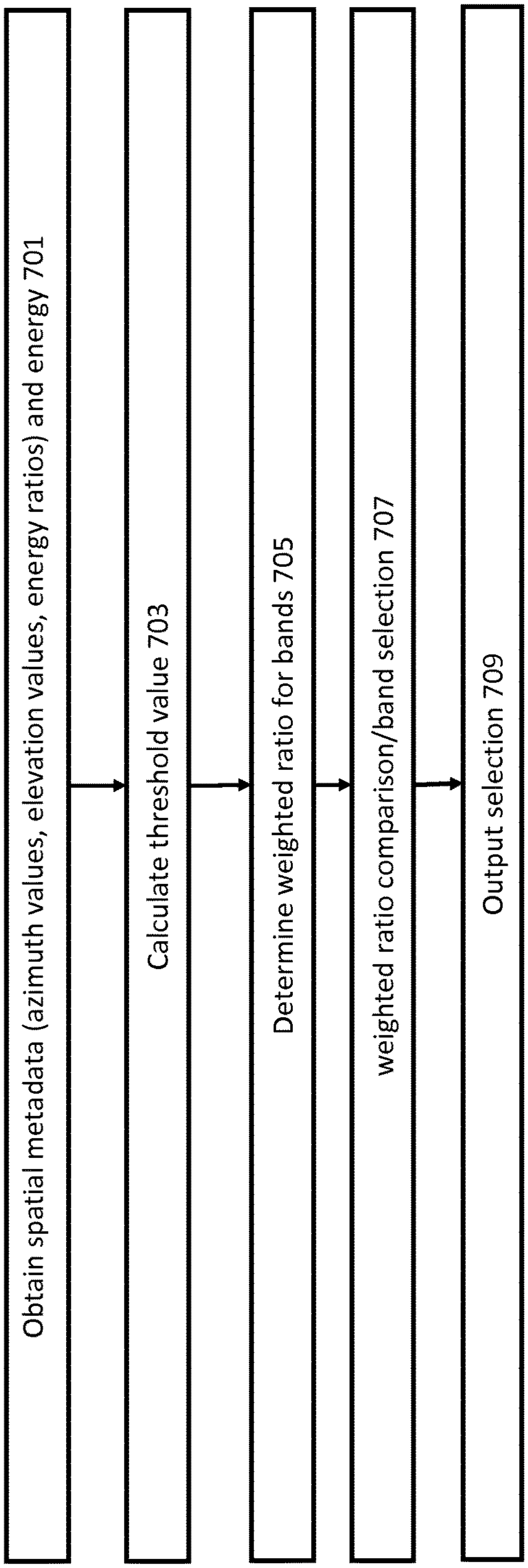
FIGS. 7 and 8 shows a flow diagram the operation of the band selector as shown in FIG. 6 according to some embodiments.
Figure 8:
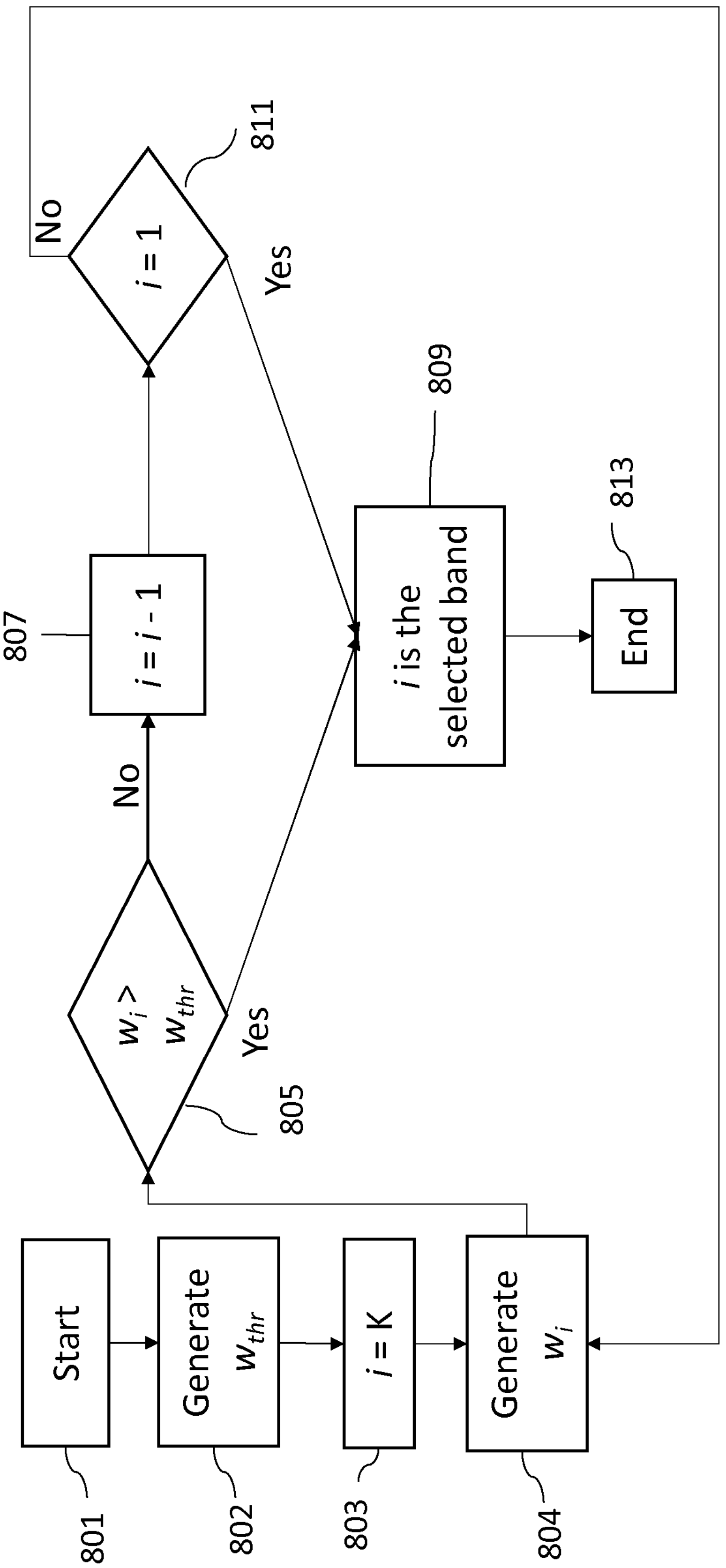

With respect to FIG. 6 is shown an example band selector, furthermore FIGS. 7 and 8 show flow diagrams of the operations of the example band selector 213.

The band selector 213 in some embodiments is configured to obtain the spatial metadata as shown in FIG. 7 by step 701.

The band selector 213 in some embodiments comprises a threshold determiner 601. The threshold determiner in some embodiments is configured to determine a threshold value $w_{thr}$. The threshold value for example may be found by the following:

$$w_{thr} = 0.5\frac{\sum_n^N \sum_k^K E(k, n)}{NK}$$

The determination of the threshold is shown in FIG. 7 by step 703.

The band selector 213 in some embodiments further comprises a weighted ratio determiner 603. The weighted ratio determiner in some embodiments is configured to determine a weighted ratio for a determined band. In some embodiments the weighted ratios are determined in order from highest frequency band K to lowest frequency band. The weighted ratio in some embodiments is determined as:

$$w(k) = \frac{\sum_n^N r_{dir}(k, n)E(k, n)}{N}$$

The operation of calculating/determining the weighted ratio is shown in FIG. 7 by step 705.

The band selector 213 in some embodiments further comprises a comparator 605. The comparator 605 is configured to perform a weighted ratio check/band selection operation as shown in FIG. 7 by step 707.

Furthermore FIG. 8 shows the comparator/selection operation in further detail.

The first operation is to start and receive the inputs such as weighted ratios/threshold values as shown in FIG. 8 by step 801.

The threshold value or weight limit $w_{thr}$ is then generated or determined as shown in FIG. 8 by step 802.

The next operation is setting an index i=K (the highest band) as shown in FIG. 8 by step 803.

The index weight factor w(i) is then generated as shown in FIG. 8 by step 804.

The next operation is testing the index weight factor w(i) against the weight limit $w_{thr}$ as shown in FIG. 8 by step 805.

If $w(i)>w_{thr}$ then the next operation is determining i is the selected frequency band as shown in FIG. 8 by step 809 and then ending the operation as shown in FIG. 8 by step 813.

If w(i) is not $>w_{thr}$ then the next operation is decrementing i by 1 as shown in FIG. 8 by step 807.

Having decremented i by 1 then the next operation is checking whether i=1 as shown in FIG. 8 by step 811.

Where i=1 then the next operation is determining i is the selected frequency band as shown in FIG. 8 by step 809 and then ending the operation as shown in FIG. 8 by step 813.

Where i is not =1 then the operation may then loop back as shown by the arrow back to the step 804 and generate the new weight factor and test the new index weight factor w(i) against the weight limit $w_{thr}$. The process may continue until $w(i)>w_{thr}$ for the index or the index=1.

The above assumes that frequency band indexing starts from 1. The above can be modified to accommodate any other indexing system (such as starting from 0).

The operation of outputting the selection (or selection index identifying the selection) is shown in FIG. 7 by step 709.

This approach is based on the method described in GB1814227.3 however any suitable single band selection method may be implemented.

The determination of the best band to represent all bands is shown in FIG. 3 by step 304.

In some embodiments the controller 201 comprises a ratio comparator 215. The ratio comparator 215 is configured to check whether this selected single band is good enough to provide benefit over merging through time. This may be done by comparing the direct-to-total ratio $r_{dir}(b)$ of the selected single band b to the energy-weighted mean direct-to-total ratio of all bands. In some embodiments the energy-weighted mean direct-to-total ratio of all bands is obtained with:

$$r_{mean} = \frac{\sum_{n}^{N} \sum_{k}^{K} r_{dir}(k, n) E(k, n)}{\sum_{n}^{N} \sum_{k}^{K} E(k, n)}$$

where $r_{dir}$ is the direct-to-total ratio and E is the energy.

In these embodiments where the direct-to-total ratio of the selected single band is higher than the mean ratio (and there is onset present), then the selected single band should be used to represent the full metadata. Otherwise, the controller 201 is configured to signal that the time-merged parameters are to be used.

In other words with respect to the ratio comparator

If $r_{dir}(b)>r_{mean}$, use single-band strategy

Otherwise, use time-merged strategy

The controller 201 can then be configured to control a subframe merger 203 and band filter 205 to implement the determined strategy.

In some embodiments the metadata encoder 111 comprises a sub-frame merger 203. The sub-frame merger 203 may be controlled by the controller to implement (or not implement) based on the above a sub-frame merging operation. For example the sub-frame merger 203 may be configured to merge all subframe parameters into a single (sub)frame parameter, i.e., merge the parameters through time.

This can be implemented by any suitable process. For example this may be implemented using the merging methods presented in UKIPO patent applications 1919130.3 and 1919131.1. In some embodiments the, directions and direct-to-total ratios are merged using the sum of direction vectors over subframe where the vectors have been weighted with corresponding direct-to-total ratios and energy. This sum vector is then pointing to the merged direction and the merged direct-to-total ratio is the length of the sum vector divided by the sum energy.

In some embodiments, no additional computation is needed for merging the direct-to-total energy ratio as the direct-to-total ratio may already be merged in time at this point (however computation may still be needed for merging the direction). Alternatively the ratios may be averaged with energy weighting. In some embodiments the subframe merger is configured to merge other parameters (e.g., spread coherence and surround coherence) with direct energy-weighted averaging of the parameters over subframes.

The sub-frame merged parameters 204 can then be output to the encoder 207.

In some embodiments the metadata encoder 111 comprises a band filter 205. The band filter 205 may be controlled by the controller to implement (or not implement) a parameter selection based on the above a band selection.

For example the band filter 205 may be configured to use the single selected frequency band to represent all frequency bands. In other words the parameters associated with the selected frequency band can be output as the parameters to be encoded by the encoder 207. This can, for example, be performed as presented in GB1814227.3, where it was noticed that this kind of method can obtain better perceptual quality than simple averaging over frequency. In some embodiments an energy-weighted direct-to-total ratio is calculated for the band.

The band selected parameters can thus be selected and passed to the encoder (when controlled by the controller based on the above).

Thus as summarized in FIG. 3 where no onset is determined/detected then the spatial metadata is merged over time for one subframe as shown in FIG. 3 by step 307.

Where an onset is determined/detected then there is determination of the best single band to represent all of the bands as shown in FIG. 3 by step 304.

The single band is then tested to determine whether the band ratio is higher than weighted mean ratio of all bands as shown in FIG. 3 by step 305.

Where the single band ratio is lower than the weighted mean ratio of all bands then the spatial metadata is merged over time for one subframe as shown in FIG. 3 by step 307.

Where the single band ratio is higher than the weighted mean ratio of all bands then the single band spatial metadata is used to represent all spatial metadata for the subframe as shown in FIG. 3 by step 306.

In some embodiments the metadata encoder 111 comprises an encoder 207. The encoder can be any suitable metadata parameter encoder. The encoder 207 can in some embodiments be configured to perform further quantization or encoding of parameters. Thus the reduced amount of metadata can then be quantized and encoded according to any suitable method.

In some embodiments the encoder furthermore generates a suitable signaling to indicate which option has been selected. This can for example be implemented with a single bit. The use of this low-bitrate metadata reduction mode may be based on the configured available bit budget per frame and thus, it does not need an explicit signalling of being in use as it can be known implicitly from the codec configuration.

In some embodiments the low-bitrate metadata reduction mode of operation could be determined at the decoder based on some other information or signalling. In such embodiments the use of this low-bitrate metadata reduction mode of operation could be signalled or indicated to the decoder by a suitable indicator or signal. For example a signalling bit could be used to indicate whether the mode is operational and then one further signalling bit used to indicate which merging option is active.

The operation of encoding the reduced metadata parameters (and signaling the reduction mode) is shown in FIG. 3 by step 309.

With the above example input metadata, the time-merged strategy will result in output of 5 frequency bands and 1 subframe for encoding, whereas the single-band-selection strategy will result in output of 1 frequency band and 4 subframes. The raw decrease of data is thus into approximately 25% of the original metadata.

In some embodiments in the decoder 133, the metadata extractor 137 is configured to determine whether a low-bitrate merging system is in use. As indicated above, in some embodiments, this may be based on a suitable signalling or indicator received from the encoder.

When the decoder determines that a merging system was used then the signalling (bit) is decoded to determine which merging strategy has been used. Based on the merging strategy determination, the reduced metadata can be duplicated or separated out (or de-merged) in time (for time-merged strategy) or frequency (for single-band-selection strategy) to fill desired time-frequency resolution (e.g., 5 bands and 4 subframes). This metadata can be then employed normally in rendering or output as part of MASA format.

In implementing these embodiments the metadata bitrate may be reduced drastically while maintaining good spatial quality due to maintaining good enough quantization resolution for the remaining parameters. Furthermore the embodiments may provide better perceptual quality than using just one merging strategy.

In the embodiments presented above, which are intended specifically for low bitrates and is most efficient when the input metadata is already in relatively low time-frequency (TF) resolution formats. However, the embodiments discussed above can be applied to any input TF-resolution. This also applies to resolution of the energy ratios and in some embodiments can be extended to 4 subframe resolution energy ratios.

In some embodiments other merging strategies and related metrics can be implemented along with the above examples. The embodiments shown above introduce a simple solution that works well and does not require complex signaling and metadata codec implementations. These merging strategies may be, for example, normal merging through frequency, and partial merging in both time and frequency.

The single band selection method has been presented in such way that the same band is selected for all subframes. However, it is also possible to select a different band for each subframe and construct a combined single band from the subframe-separated bands. This in some embodiments may offer quality improvement.

As with most encoder-based metadata reduction processes, also this process may be performed before the encoding or during the generation of the metadata (the analysis operations).

Figure 9:
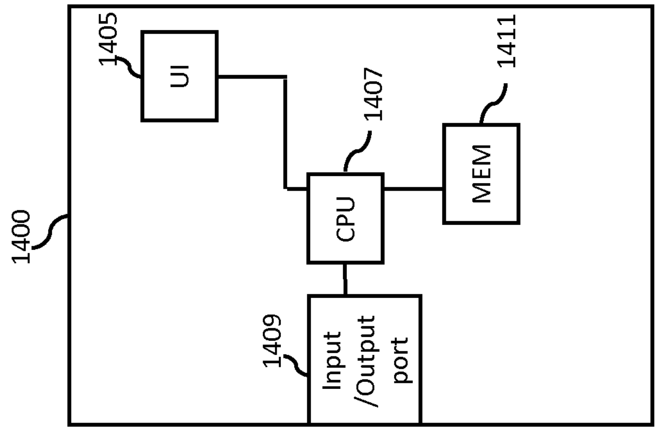
FIG. 9 shows schematically an example device suitable for implementing the apparatus shown.

With respect to FIG. 9 an example electronic device which may be used as the analysis or synthesis device is shown. The device may be any suitable electronics device or apparatus. For example in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware.

The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including computer program code, the at least one memory and the computer program code configured to, with the at least one processor, cause the apparatus to:

obtain, for at least one audio signal, spatial audio signal parameter values, the spatial audio signal parameter values distributed within a time-frequency domain;

determine a merge metric to control a merging of the spatial audio signal parameter values over the time-frequency domain; and merge, based on the merge metric, the spatial audio signal parameter values to a smaller number of spatial audio signal parameter values over time and/or frequency within the time-frequency domain by the apparatus being caused to:

determine an onset metric for detecting a start of a sound event;

determine a spatial audio signal parameter frequency band which best represents spatial audio signal parameter frequency bands within a time period when the onset metric indicates the start of the sound event, by the apparatus being caused to determine whether, for the determined spatial audio signal parameter frequency band, an energy ratio of the frequency band is greater than a weighted mean of an energy ratio of frequency bands within the time period; and merge the spatial audio signal parameter values to a smaller number of spatial audio signal parameter values over frequency when the energy ratio of the determined spatial audio signal parameter frequency band is greater than the weighted mean of the energy ratio of frequency bands within the time period.

2. The apparatus as claimed in claim 1, wherein the apparatus caused to determine the onset metric is caused to:
determine an energy parameter for the at least one audio signal over a time period;
determine a slow audio signal envelope based on the energy parameter and a slow decay time;
determine a fast audio signal envelope based on the energy parameter and a fast decay time; and
determine an onset metric based on the slow audio signal envelope and fast audio signal envelope.

3. The apparatus as claimed in claim 1, wherein the apparatus caused to merge, based on the merge metric, the spatial audio signal parameter values to a smaller number of spatial audio signal parameter values over time and/or frequency within the time-frequency domain is caused to merge the spatial audio signal parameter values to a smaller number of spatial audio signal parameter values over time when the energy ratio of the determined spatial audio signal parameter frequency band is less than the weighted mean of the energy ratio of frequency bands within the time period.

4. The apparatus as claimed in claim 1, wherein the apparatus caused to merge, based on the merge metric, the spatial audio signal parameter values to a smaller number of spatial audio signal parameter values over time and/or frequency within the time-frequency domain is caused to merge the spatial audio signal parameter values to a smaller number of spatial audio signal parameter values over time when the onset metric indicates an absence of a start of a sound event.

5. The apparatus as claimed in claim 1, wherein the apparatus is further caused to encode the merged spatial audio signal parameter values.

6. The apparatus as claimed in claim 5, wherein the apparatus caused to encode the merged spatial audio signal parameter values is caused to quantize the merged spatial audio signals parameter values.

7. The apparatus as claimed in claim 5, wherein the apparatus caused to encode the merged spatial audio signal parameter values is caused to entropy encode the merged spatial audio signals parameter values.

8. A method comprising:
obtaining, for at least one audio signal, spatial audio signal parameter values, the spatial audio signal parameter values distributed within a time-frequency domain;
determining a merge metric to control a merging of the spatial audio signal parameter values over the time-frequency domain; and
merging, based on the merge metric, the spatial audio signal parameter values to a smaller number of spatial audio signal parameter values over time and/or frequency within the time-frequency domain by the method comprising:
determining an onset metric for detecting a start of a sound event;
determining a spatial audio signal parameter frequency band which best represents spatial audio signal parameter frequency bands within a time period when the onset metric indicates the start of the sound event, by determining whether, for the determined spatial audio signal parameter frequency band, an energy ratio of the frequency band is greater than a weighted mean of an energy ratio of frequency bands within the time period; and
merging the spatial audio signal parameter values to a smaller number of spatial audio signal parameter values over frequency when the energy ratio of the determined spatial audio signal parameter frequency band is greater than the weighted mean of the energy ratio of frequency bands within the time period.

9. The method as claimed in claim 8, wherein determining the onset metric comprises:
determining an energy parameter for the at least one audio signal over a time period;
determining a slow audio signal envelope based on the energy parameter and a slow decay time;
determining a fast audio signal envelope based on the energy parameter and a fast decay time; and
determining an onset metric based on the slow audio signal envelope and fast audio signal envelope.

* * * * *